UNITED STATES PATENT OFFICE.

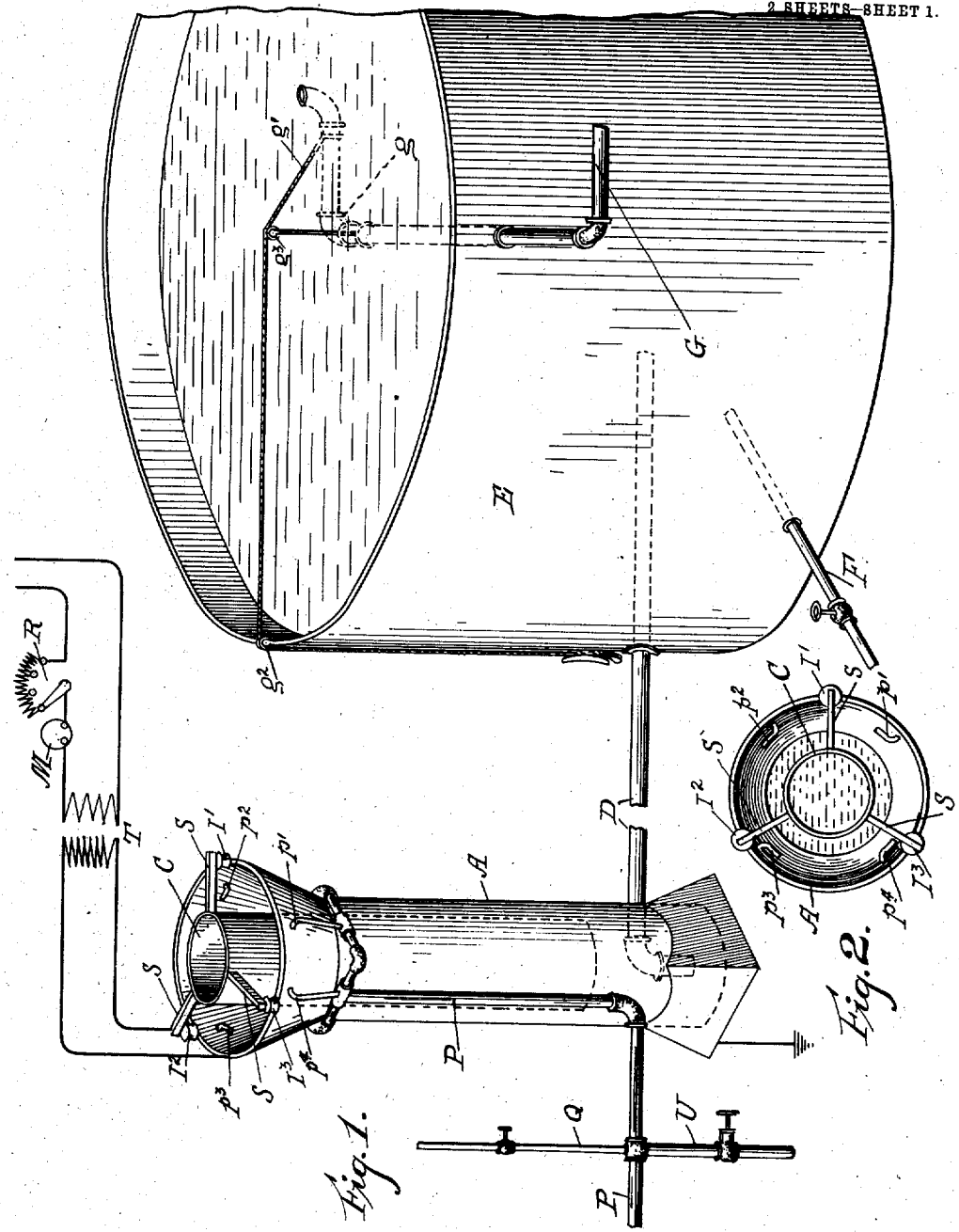

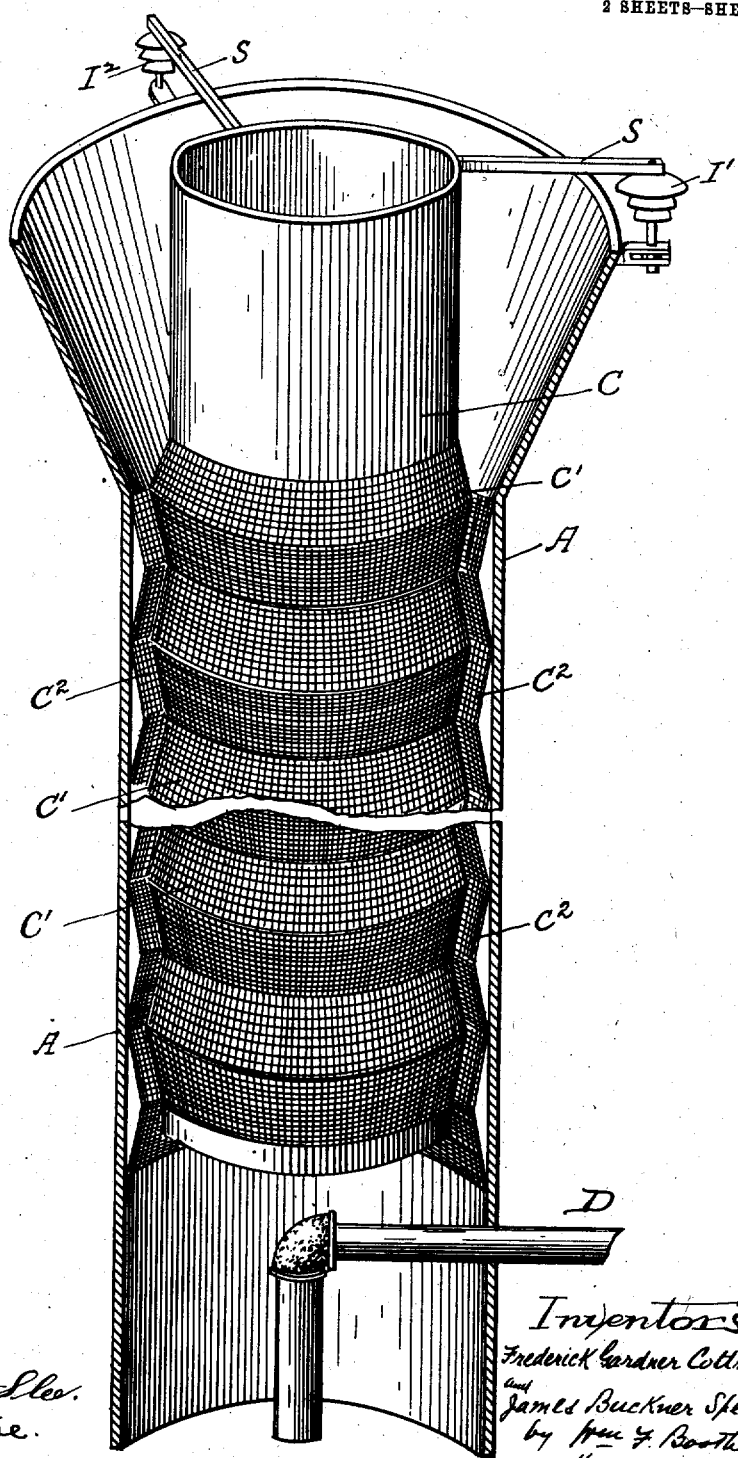

FREDERICK GARDNER COTTRELL AND JAMES BUCKNER SPEED, OF BERKELEY, CALIFORNIA, ASSIGNORS, BY MESNE ASSIGNMENTS, TO PETROLEUM RECTIFYING COMPANY, OF SAN FRANCISCO, CALIFORNIA, A CORPORATION OF CALIFORNIA.

APPARATUS FOR SEPARATING AND COLLECTING PARTICLES OF ONE LIQUID SUSPENDED IN ANOTHER LIQUID.

987,116.      Specification of Letters Patent.      Patented Mar. 21, 1911.

Application filed May 20, 1909, Serial No. 497,168.    Renewed October 12, 1910.    Serial No. 586,795.

*To all whom it may concern:*

Be it known that we, FREDERICK GARDNER COTTRELL and JAMES BUCKNER SPEED, citizens of the United States, residing at Berkeley, in the county of Alameda and State of California, have invented certain new and useful Improvements in Apparatus for Separating and Collecting Particles of One Liquid Suspended in Another Liquid, of which the following is a specification.

Our invention relates to apparatus used in the separation and collection of fine particles of one liquid suspended in another, and may serve to carry out the process of separating and collecting such particles which forms the subject matter of a contemporaneous application Serial Number 497,167 filed May 20 1909, and which may be briefly and generally stated to consist in causing the mixture to be separated to flow, under proper conditions, between electrodes charged to high differences of electrical potential, whereby the fine particles are caused to aggregate into larger masses which then readily separate owing to the differences in buoyancy of the two liquids.

In an apparatus for this purpose it is desirable that the material to be treated be delivered to the electrodes in as limpid and homogeneous state as possible, and flow in a perfectly uniform manner past the electrodes, preferably in the same general direction in which the aggregating masses tend to move under the buoyant forces, for example, downward, in the case of water droplets suspended in oil, under the influence of gravity. It is furthermore essential to the most efficient working of the method that the electric field between the electrodes be as strong as is consistent with the avoidance of destructive disruptive discharges and short circuits, and that the arrangement of electrodes and conditions of flow of the material under treatment be such that all of the latter pass uniformly through said electric field.

An apparatus fulfilling these requirements is described below, and illustrates, together with its accessory parts, the type of construction which constitutes the present invention and is generically defined in the accompanying claims.

Having reference to the accompanying drawings—Figure 1 is a general view of the complete apparatus diagrammatically illustrated in one of its simplest forms. Fig. 2 is a plan of the electrically treating vessel. Fig. 3 shows the details of a special type of electrodes.

In Fig. 1 A is a vessel containing the oil undergoing the electrical treatment and itself serves as one of the electrodes, being connected to the ground and also to one of the high potential terminals of the step-up transformer T. The other high potential terminal of the transformer is connected to the electrode C represented in the figure as an inner shell concentric with the wall of the vessel A and supported thereon by the insulators $I'$, $I^2$, $I^3$ and the spider S. The low potential terminals of the transformer are connected through the ammeter M and regulating rheostat R with the electric service mains, as, for example, an incandescent lighting circuit.

The oil and water mixture to be treated is received through the pipe P, and is heated to any desired temperature for the purpose of decreasing its viscosity, by the injection of live steam through the pipe Q. The other inlet U serves to introduce either oil already treated, or sludge or even water. The mixture enters the top of the treating vessel through the tangentially directed jets $p'$, $p^2$, $p^3$, $p^4$ thus insuring a thorough mixing and uniform composition at the top of the treating vessel, as well as occasioning a steady motion of the surface of the liquid in the funnel shaped top at right angles to the lines of force of the electric field, thus lessening the tendency to electrical leakage, and break-down in the surface layers. The material thus supplied to the top of the vessel flows uniformly down through the annular space around the inner electrode where the electrical treatment chiefly occurs, and is finally carried out of the bottom of the treating vessel A through the pipe D which is of large enough diameter to insure a quiet flow free from churning that might tend to reemulsify the separating liquids. The pipe D discharges into the settling tank E, preferably its lower portion, where the final separation of the oil and water is accomplished, the latter being drawn off together with any residual sludge, through the outlet F and the purified oil through the outlet G which latter is preferably so constructed as to allow of a vertical adjustment of its intake end within the tank, as indicated in the figure by the flexible joint $g$, and the adjusting cord $g'$ passing over the pulleys $g^2$, $g^3$. As for any given rate of flow, the level in the tank E also determines the level in the vessel A, this adjustment serves to control the level of material in vessel A.

The chief reason for adopting the funnel shaped top for the vessel A lies in our discovery that it is essential for the proper working of the method not to allow the essentially active surfaces of the electrodes (by which term is to be understood those portions which are in sufficient proximity to the electrode of opposite polarity to be really efficient in producing coalescence of the intervening suspended particles) to emerge from the liquid undergoing treatment into the air, or even come too close to the surface of contact between air and liquid in close proximity to one another; for when this happens there is a decided tendency for the partially agglomerated water to collect in these surface layers and cause short circuiting of the electrodes. Care must, therefore, be taken to have the active portion of the electrodes deeply immersed in the liquid under treatment, as is the case in the illustration. On account of the funnel shaped top of the vessel, the only portion of the suspended electrode C which comes into these surface layers is at so much greater distance from the wall of the vessel than its deeper active portion, as to occasion no difficulty. In this same connection, a further advantage of the above described arrangement lies in the fact that the upper surface of the material in the treating vessel is continually renewed and stirred by the inflow of untreated oil which is a better insulator than that which is in the incipient stages of chain building and coalescence in the deeper parts of the vessel, thus still further reducing the tendency to surface leakage. Reference to Fig. 1, will also make it evident that one of the essential features of our arrangement is the supporting of the inner electrode entirely free from solid bodies of any material whatsoever below the surface of the liquid under treatment, for even if such supports were made of the very best solid insulators known, they would soon become coated with conducting films of water, and short circuit the electrodes. The downward direction of flow between the active electrode surfaces is also an important detail as it prevents the danger of short circuits from an accumulation of water-rich masses between the electrodes which are very apt to result if an upward flow is used, as in this latter case the gravitative tendency of the enlarged droplets is partly offset by the buoyant action of the upward current of liquid.

Another feature of the above described apparatus which deserves special mention is the heating of the oil by injection of steam directly into it. This method of heating although one of the most efficient and convenient possible, is inadvisable in most cases other than the present, because of the finely emulsified condition in which the condensed water is apt to be left in the oil. In the present case this feature is so specifically provided for by the subsequent electrical treatment as to present no drawback, and hence the combination with the rest of the apparatus of this means of rendering the oil more fluid and adaptable to the electrical and settling treatment becomes an essential part of our apparatus.

A modification of electrode surface is shown in Fig. 3. This consists in surrounding the central shell C with a cylinder C′ of pervious conducting material such as wire screen attached thereto and so corrugated as to form a set of circular ribs. Another similar cylinder C² is fitted to the inner wall of the containing vessel, the relation of the corrugations of the two cylinders when in adjustment being such that the surface of the two are at essentially the same distance apart throughout, and their relative diameters being such as to allow the inner to be inserted in or withdrawn from the outer one without deformation of either, as indicated in the figure. These corrugations may be produced either by pressing or rolling the screen as a whole or may be built up by uniting strips cut to the proper size and shape, and the corrugations may be either distinctly angular as shown or rounded or sinuous, the object of such structure being to bring all parts of the material under treatment during its downward flow under as nearly as possible the same condition as regards distance from electrodes.

Having thus described our invention, what we claim as new and desire to secure by Letters Patent is—

1. In an apparatus for separating and collecting particles of one liquid suspended in another, the combination of a containing vessel, and a system of electrodes therein, connected to a high potential source of electricity the relative position of electrodes of opposite polarity being maintained by insulating supports which are entirely out of contact with the liquid undergoing treatment, said electrodes being so arranged as to maintain in the deeper layers of the material to be treated an electric field of sufficient intensity to cause coalescence of the suspended particles, and said electrodes being further so arranged that in the surface layers of said material, those of opposite polarity are at such distance apart that the electrical field between them is weaker than in said deeper layers of the material.

2. In an apparatus for separating and collecting particles of one liquid suspended in another, the combination of a containing vessel; a system of electrodes therein connected to a high potential source of electricity the relative position of electrodes of opposite polarity being maintained by insulating supports which are entirely out of contact with the liquid undergoing treatment; means for delivering the mixture of liquids to be treated upon the surface of the mass of liquid in said containing vessel in the form of streams crossing the direction of the electric force lines between the electrodes of opposite polarity; and means for discharging the contents of said containing vessel from its lower end.

3. In an apparatus for separating and collecting particles of one liquid suspended in another, the combination of a containing vessel; a system of electrodes therein connected to a high potential source of electricity; means for delivering the mixture of liquids to be treated upon the surface of the mass of liquid in said containing vessel in the form of streams crossing the direction of the electric force lines between the electrodes of opposite polarity; a settling reservoir into which the contents of the containing vessel is discharged; means for discharging the heavier of the two liquids from the lower portions of said reservoir; and means for discharging the lighter of the two liquids from the upper portions of said reservoir.

4. In an apparatus for separating and collecting particles of one liquid suspended in another, the combination of a vertically disposed vessel of electrically conducting material having a funnel shaped top; an electrically conducting shell of smaller diameter within, concentric with and electrically insulated from said vessel by suitable supports disposed at the upper ends of said vessel and shell; means for delivering the material to be treated to the top of said vessel; means for withdrawing the material, after treatment, from the bottom of said vessel; and electrical connections of said vessel and shell, respectively, to the two poles of a high potential source of electricity.

5. In an apparatus for separating and collecting particles of one liquid suspended in another, the combination of a vertically disposed vessel of electrically conducting material having a funnel shaped top; an electrically conducting shell of smaller diameter within, concentric with and electrically insulated from said vessel by suitable supports disposed at the upper ends of said vessel and shell; means for delivering the material to be treated to the top of said vessel; a settling reservoir communicating with the bottom of said vessel through a suitable conduit; and an overflow outlet, adjustable as to height, for said settling reservoir, by means of which the level of the material in the funnel shaped top of the first named vessel may be regulated and controlled under various rates of flow of the material being treated.

6. In an apparatus for separating and collecting particles of one liquid suspended in another, the combination of a containing vessel; a system of electrodes therein connected to a high potential source of electricity; a pipe for delivering the mixture of liquids to be treated to said vessel; and a steam jet entering said pipe to inject live steam into said mixture to heat it on its way to said electrode system.

7. In an apparatus for separating and collecting particles of one liquid suspended in another, the combination of a containing vessel; a system of electrodes within said vessel comprising vertical concentric corrugated pervious cylinders of electrically conducting material connected to a high-voltage source of electricity; means for supplying the mixture of liquids to be treated to the top of said vessel; and means for withdrawing said material from the bottom of said vessel after treatment.

In testimony whereof we have signed our names to this specification in the presence of two subscribing witnesses.

FREDERICK GARDNER COTTRELL.
JAMES BUCKNER SPEED.

Witnesses:
WM. F. BOOTH,
D. B. RICHARDS.